United States Patent
Salter et al.

(10) Patent No.: US 9,949,334 B2
(45) Date of Patent: Apr. 17, 2018

(54) ESD PROTECTION FOR DYNAMIC LIGHTING

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US); Steven J. Antilla, Brighton, MI (US); Daniel Weckstein, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 14/267,438

(22) Filed: May 1, 2014

(65) Prior Publication Data

US 2015/0319815 A1    Nov. 5, 2015

(51) Int. Cl.
| | |
|---|---|
| F21V 5/04 | (2006.01) |
| H05B 33/08 | (2006.01) |
| F21V 5/00 | (2018.01) |
| F21V 23/00 | (2015.01) |
| B60Q 3/74 | (2017.01) |
| B60Q 3/78 | (2017.01) |
| B60Q 3/80 | (2017.01) |

(52) U.S. Cl.
CPC ............. *H05B 33/089* (2013.01); *B60Q 3/74* (2017.02); *B60Q 3/78* (2017.02); *B60Q 3/80* (2017.02); *F21V 5/007* (2013.01); *F21V 23/005* (2013.01); *F21V 23/008* (2013.01)

(58) Field of Classification Search
CPC ... H01L 25/167; H05B 33/089; B60Q 3/0279; B60Q 3/0289; B60Q 3/0293
See application file for complete search history.

(56) References Cited

U.S. PATENT DOCUMENTS

| | | |
|---|---|---|
| 6,536,913 B1 | 3/2003 | Yajima et al. |
| 7,898,821 B2 | 3/2011 | Pekkarinen et al. |
| 8,258,702 B2 | 9/2012 | Zielinski et al. |
| 8,330,385 B2 | 12/2012 | Salter et al. |
| 8,476,832 B2 | 7/2013 | Prodin et al. |
| 8,593,610 B2 | 11/2013 | Jeong et al. |
| 2005/0083713 A1* | 4/2005 | Boks .................... G02B 6/0028 362/561 |
| 2008/0062686 A1* | 3/2008 | Hoelen .................. G02B 6/002 362/240 |
| 2009/0052165 A1* | 2/2009 | Hamada ............... G02B 6/0031 362/97.3 |
| 2014/0111894 A1* | 4/2014 | Schug ................. H01L 27/0248 361/56 |

FOREIGN PATENT DOCUMENTS

WO    2013127675 A1    9/2013

* cited by examiner

*Primary Examiner* — Anh Mai
*Assistant Examiner* — Nathaniel Lee
(74) *Attorney, Agent, or Firm* — Vichit Chea; Price Heneveld LLP

(57) ABSTRACT

A lighting assembly including a circuit is disclosed. The circuit is configured to be disposed in a panel defining a cavity forming an opening. The circuit includes a light source in communication with a controller and an exposed conductive portion conductively connected to an isolation terminal. The exposed conductive portion is oriented proximate the opening and provides a path for an electrical discharge to protect the light source from the electrical discharge.

18 Claims, 5 Drawing Sheets

ESD PROTECTION FOR DYNAMIC LIGHTING

FIELD OF THE INVENTION

The present invention generally relates to lighting devices, and more particularly relates to a lighting device configured to protect a light source from an electrical discharge.

SUMMARY OF THE INVENTION

According to one aspect of the present invention, a lighting assembly comprising a circuit or a flexible circuit is disclosed. The circuit is configured to be disposed in a panel defining a cavity forming an opening. The circuit comprises a light source (or device) in communication with a controller and an exposed conductive portion conductively connected to an isolation terminal. The exposed conductive portion is oriented proximate the opening and provides a path for an electrical discharge to protect the light source and associated circuitry from the electrical discharge.

According to another aspect of the present invention, a dynamic lighting apparatus is disclosed comprising a circuit. The circuit may be of rigid or pliable construction and comprises a plurality of light sources proximate a first edge portion and an exposed grounded conductor proximate a second edge portion. The circuit further comprises a controller in communication with each of the plurality of lights. The circuit is configured to be disposed in a panel defining an elongated trough, and the exposed grounded conductor is oriented proximate an opening formed by the trough to isolate the circuit from ESD.

According to yet another aspect of the present invention, a circuit assembly is disclosed comprising a plurality of light sources proximate a first edge portion. Each light of the plurality of lights is individually and/or in groups in communication with a controller. The circuit assembly further comprises an exposed conductive portion connected to an isolation terminal extending proximate a second edge portion. The circuit assembly is configured to be disposed in a trough comprising an opening proximate the second edge portion such that the ESD is directed away from the plurality of lights.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
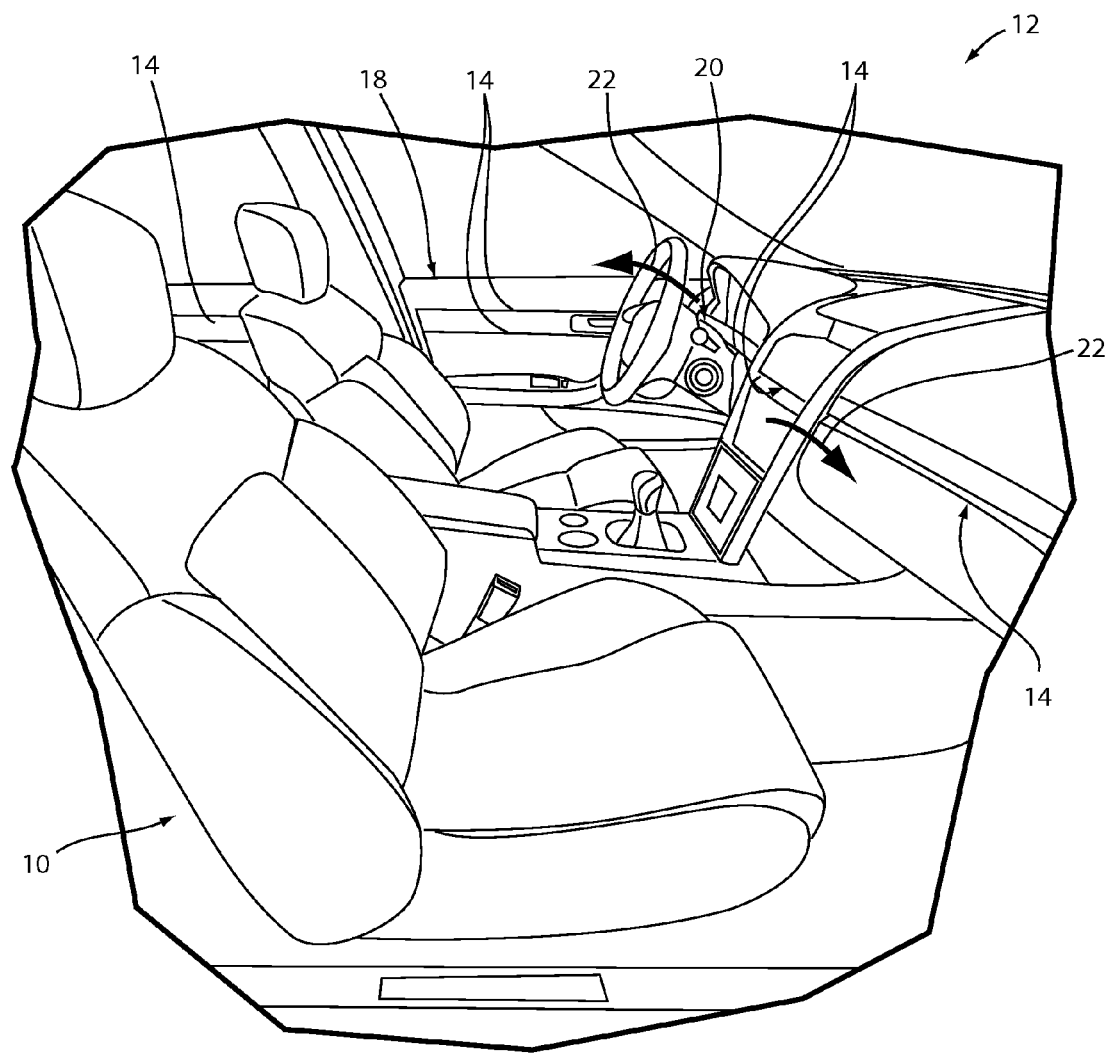
FIG. 1 is an perspective view of a passenger compartment of a vehicle.

Referring to FIG. 1, a perspective view of a passenger compartment 10 of a vehicle 12 is shown in accordance with the disclosure. The vehicle 12 is equipped with a lighting system, for example a dynamic lighting system including a plurality of lights. The lighting system may be implemented by a lighting device comprising a rigid or flexible/pliable circuit disposed in any number of cavities 14 throughout the interior of the vehicle 12. In various implementations, the lighting system may be implemented to provide ambient lighting for the passenger compartment 10 of the vehicle 12. The lighting system is configured to provide a continuous backlit glowing light emitted along a length of each of the cavities 14. The ambient lighting provided by the lighting system may be utilized to provide various interior lighting features. For example, the lighting system may provide for dynamic lighting that may be implemented to create a visual effect of moving lighting throughout the passenger compartment 10.

The dynamic lighting provided by the lighting system may be utilized to create various visual effects that may provide a visually pleasing aesthetic in the passenger compartment 10. The lighting system may provide various lighting output functions in response to a plurality of vehicle controls or inputs. The lighting system may be controlled via a central controller in communication with the vehicle inputs. A dynamic lighting function of the lighting system may be activated in response to a passenger door 18 of the vehicle 12 opening or closing, a locking or unlocking operation, a vehicle ignition or shutdown event, or any other events that may occur during entry and operation of the vehicle 12.

Dynamic lighting may refer to light emitted from one or more light sources to provide dimming, brightening, or any sequential activation of light sources in a sequence. Dynamic lighting may also refer to any other form of light emitted from a plurality of light sources configured to change a brightness or color or illuminate a plurality of lights in various positions over time. For example, the lighting system may be implemented to provide dynamic lighting that appears to move from a steering column 20, through the cavities 14, and around the passenger compartment 10 in response to a vehicle ignition event. In this example, the motion of the dynamic lighting is demonstrated by the arrows 22. The lighting system is configured to provide various benefits including cost-effective implementations of dynamic lighting while maintaining robust operation including protection from electrostatic discharge (ESD).

Various modern lighting systems implement light emitting diodes (LEDs) as light sources. LEDs provide various benefits including long life and limited power usage, but also may be susceptible to damage due to electricity that is discharged within their proximity such as static discharge from occupants or from other sources. The lighting system disclosed herein provides for a novel approach to implement dynamic lighting in the vehicle 12 by including an exposed conductive portion on a circuit proximate an opening 24 of each of the cavities 14. In this way, the circuit of the lighting system is configured such that a package size of the circuit is significantly decreased. Further, each lighting device disposed in the cavities 14 may be safely installed in the passenger compartment near a potential area of ESD without risking damage to the lighting system.

Figure 2:
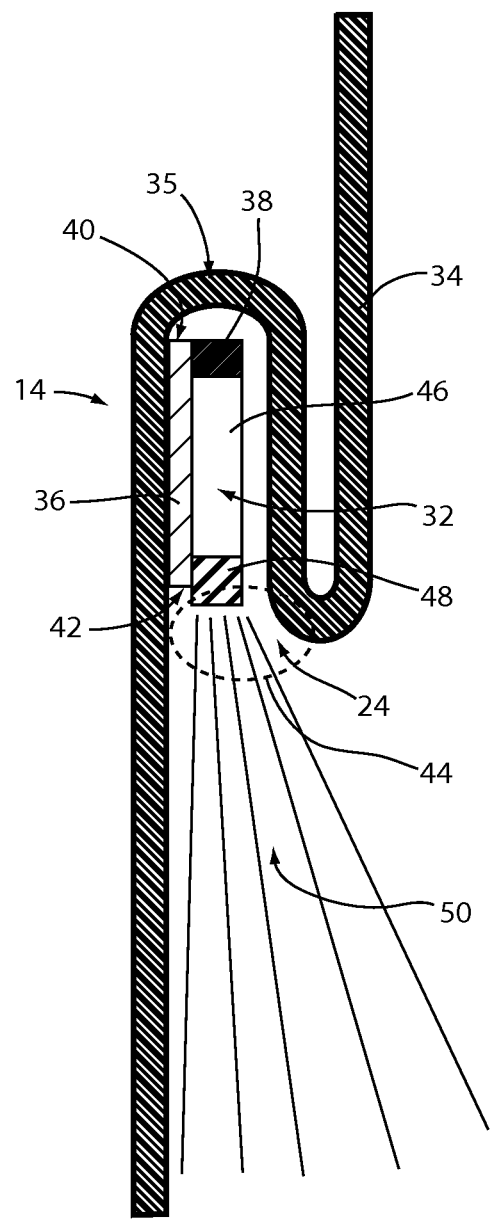
FIG. 2 is a cross-sectional view of a panel of a vehicle forming a cavity demonstrating an assembled, cross-sectional view of a lighting device.

Referring now to FIG. 2, a cross-sectional view of a cavity 14 in a vehicle 12 is shown demonstrating a cross-sectional view of a lighting device 32 for a lighting system. In this example, the cavity 14 is formed by a panel 34 having an enclosed portion 35. The cavity 14 may be formed by any portion of the vehicle 12, for example a trim panel of the vehicle 12. The enclosed portion may correspond to a portion that is not readily accessible by an operator of the vehicle 12. The panel 34 is formed such that the cavity 14 is configured to receive the lighting device 32. The cavity 14 is formed by the panel 34 and extends along an interior surface of the vehicle 12 to form an elongated trough. The elongated trough forms the opening 24 from which light is emitted from the lighting device 32.

Though the panel 34 is shown in this example having a particular shape forming the cavity 14, the lighting device 32 may be implemented in various interior and/or exterior portions of the vehicle 12. For example, a rigid or a flexible circuit 36 may similarly be disposed in a cavity or plurality of cavities formed along a headliner and corresponding headliner trim panels in the vehicle 12. Similarly, the circuit 36 may be disposed in a cavity formed by a panel located along an edge of any panel of the vehicle 12, for example a door panel or a trim panel extending along a trunk liner. In the various examples discussed herein, the term panel may refer to any portion or portions of the vehicle 12. A cavity may be formed by a panel such that the lighting device 32 may be disposed therein. The portion or portions of the vehicle may further form an opening, similar to the opening 24, such that light emitted from the lighting device 32 may pass outward through the opening and provide glowing light emitted from the cavity.

The lighting device 32 comprises the circuit 36 in electrical communication with a light source which, in one embodiment include, at least one light emitting diode (LED) 38. The circuit 36 comprises a first edge portion 40 and a second edge portion 42. The circuit 36 is oriented in the cavity 14 such that second edge portion 42 is oriented proximate the opening 24. The LED 38 is shown connected to the circuit 36 proximate the first edge portion 40. The circuit 36 further comprises a conductive portion, for example an exposed conductive portion proximate the second edge portion 42. The conductive portion corresponds to an isolation terminal that may be implemented by an exposed ground terminal of the circuit 36. The conductive portion is positioned proximate the opening 24 and configured to conduct an electrical discharge, for example an ESD, away from the at least one LED 38.

As discussed previously, LEDs may be implemented to provide various benefits, but may be susceptible to electrical discharges which can cause permanent damage to lighting devices similar to the lighting device 32. To prevent damage from local electrical discharges, LEDs are typically positioned at least 25 mm away from a touchable region. A touchable region may refer an area or region that may be touched by a passenger of a vehicle such that an electrical discharge may take place in the area. The spacing between an LED and a touchable region leads to excessive space consumption when implementing LEDs in lighting systems or may interfere with the intended lighting effect. The lighting device 32 provides for a significant reduction in the required spacing from a touchable region 44 while preventing damage to the LED 38 from local electrical discharges.

The lighting device 32 provides various benefits including limiting a package size and a corresponding cavity size in which the lighting device 32 may be disposed in the vehicle 12. The lighting device 32 is configured to receive an electrical discharge proximate the touchable region 44 in the vehicle 12 and prevent damage to the at least one LED 38 by providing an isolated, conductive path to conduct the electrical discharge away from the at least one LED 38. Further details of the lighting device 32, the circuit 36, and other components of the lighting device 32 are discussed in further detail in reference to FIGS. 3-5.

The lighting device 32 further comprises a first lens 46 and a second lens 48. The first lens 46 may be a spreader lens. The first lens 46 is configured to receive light from the at least one LED 38 and spread the light along a length of the panel 34. According to one embodiment, the first lens 46 is configured such that light is emitted at a consistent intensity along the opening 24 of the cavity 14. The second lens 48 may be a diffuser lens configured to receive the light from the first lens 46 and further spread or scatter the light. The first and second lenses 46, 48 are configured such that the light from the LED 38 is emitted along the length of the opening 24 to provide a soft uniform ambient glow emitted from the opening 24. An emitted light 50 from the cavity 14 is illustrated in FIG. 2 as a plurality of light rays extending outward from the cavity 14.

The circuit 36 may comprise any printed circuit board (PCB), a flexible or pliable circuit, flexible printed wiring, a flex print or flexi circuit, or any other form of circuit. The flexible circuit 36 may be configured to have various dimensions configured to conform to the proportions of a cavity. In some implementations the flexible circuit 36 may be configured having a flexible or pliable construction such that the width and length of the circuit may flex and conform to variations in a length of the cavity 14. In some embodiments, the circuit 36 may form a thin, pliable structure providing various benefits allowing the circuit 36 to be implemented having a low profile configured to project an ambient glow from the panel 34 or any structure in which the circuit is implemented.

The circuit 36 may be formed from a variety of materials. In some implementations, the circuit 36 may be formed of various layers, for example base layers, bonding layers, protective layers, and conductive layers. A base layer may be formed from a base film having a polymer structure such as polyester (PET), polyimide (PI), polyethylene napthalate (PEN), polyetherimide (PEI), as well as various fluropolymers (FEP), copolymers Polyimide films, or other suitable materials. A bonding layer may comprise a bonding adhesive or laminate configured to adhere and seal the conductive layers to the one or more base layers. A bonding adhesive may be of a polymer base or any material operable to bond a conductive layer to a base layer. The conductive layers may comprise conductive elements formed from conductive metal foils or conductive inks, paints or films. The conductive layers may vary in thickness, material and proportions to effectively conduct electrical current for power or signals from a central controller to control the lighting of the at least one LED 38. The conductive elements may comprise any form of conductive material and in some implementations may be of copper formed of a wrought type, annealed type, electroplated, or any other form. The various materials and constructions of the circuits disclosed herein are exemplary and should not be considered limiting to the disclosure.

A pliable implementation of the circuit 36 may be formed by applying a variety of manufacturing techniques and materials. A rigid or semi-flexible implementation may similarly be manufactured by implementing a variety of techniques. The construction of the circuit may be implemented by any one of or a combination of a single-sided flex circuit, double access flex circuit, sculptured flex circuit, double-sided flex circuit, multilayer flex circuit, rigid-flex circuit, polymer thick film flex circuit, or any other circuit type including those yet to be developed. The specific construction of the circuit 36 may vary to correspond to a variety of applications. The number of layers and particular construction may further vary in implementations that apply the circuit 36 in combination with additional systems, integrated circuits, and data interfaces implemented in the vehicle 12.

The first lens 46 and the second lens 48 may be constructed from any material operable to transfer light therethrough. The first lens 46 is configured to have a triangular profile shape such that light received from the LED 38 is spread from a narrow top portion and distributed through a widened bottom portion. Further details of the lighting device are discussed in reference to FIG. 3B. The second lens 48 may be configured to have an etched, frosted, or roughed surface and/or be constructed having a material structure configured to scatter the light received from the first lens 46. The first lens 46 and the second lens 48 are configured to project the emitted light 50 consistently across the length of the opening 24. In some implementations, the first lens 46 and the second lens 48 may be of a polymeric material. Though the first lens 46 and the second lens 48 are described as discrete lenses of the lighting device 32, the first lens 46 and the second lens 48 may be combined, molded together, connected to form a single lens, or formed in one piece of the same material. The single lens may be configured to both spread and diffuse light emitted from the at least one LED 38 or if desired, change the color of the emitted light.

Figures 3A, 3B:
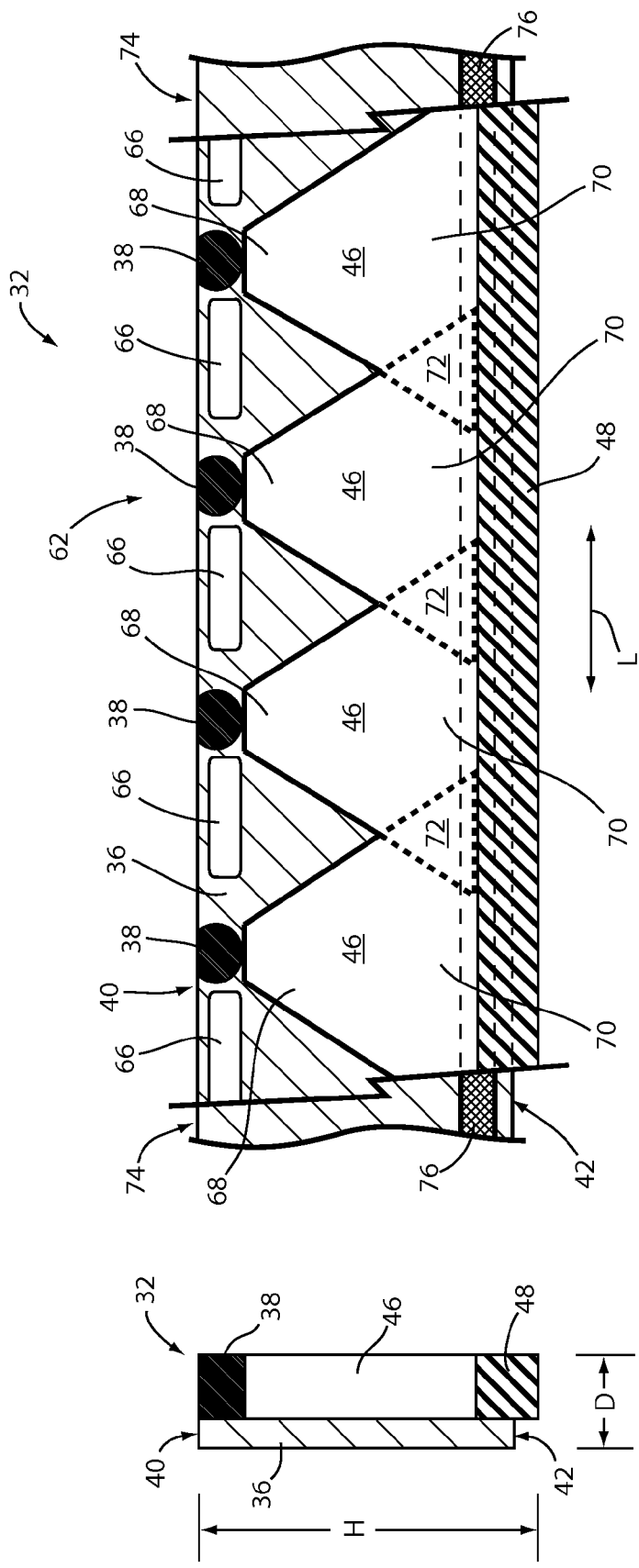
FIG. 3A is cross-sectional view of a lighting device including a plurality of lenses.
FIG. 3B is front view of a lighting device including a plurality of lenses.

Referring now to FIGS. 3A and 3B, a cross-sectional view and a front view of the lighting device 32 are shown respectively. The cross-sectional view of the lighting device 32, shown in FIG. 3A, demonstrates the circuit 36, the at least one LED 38, the first lens 46, and the second lens 48. The lighting device 32 is configured to protect the at least one LED 38 from an electrical discharge and further provide for the lighting device 32 to have a compact package size. In some implementations, a depth D of the lighting device 32 may be less than 10 mm. A height H of the lighting device may be less than 20 mm. In an exemplary implementation the depth D is approximately 3 mm or less, and the height H is approximately 6 mm or less. In such implementations the package size of the lighting device 32 may be implemented with the at least one LED 38 being located less than 25 mm from a potential touchable region 44 proximate the second edge portion 42. This advantageous, space-saving design may be implemented while preventing damage to the at least one LED 38 by providing the conductive portion 76 proximate the second edge portion 42.

The front view of the lighting device 32, shown in FIG. 3B, demonstrates an assembled portion 62 of the lighting device 32 demonstrating the circuit 36 and the second lens 48. In FIG. 3B, the lighting device 32 is shown including groupings of the first lens 46 and the at least one LED 38 evenly spaced along a length L of the lighting device 32. Further, a light controller 66 is in communication with each of the at least one LED 38. Each light controller is configured to control the light emitted from the at least one LED 38. In some embodiments, the lighting device 32 may form an elongated flexible assembly configured to emit light consistently along the length L of the lighting device 32.

Each of the light controllers 66 is in communication with a central controller via a control line. In response to a signal from the central controller, each of the light controllers 66 is operable to control the light emitted from each of the LEDs 38 or a designated group of the LEDs 38. Further discussion of various aspects of the lighting device 32 including the central controller, the control line, and other various details are omitted in FIG. 3B for clarity. Such details are discussed further in reference to FIGS. 4 and 5.

The light emitted from each of the LEDs 38 is received by each of the first lenses 46 and distributed along the length L of the lighting device 32 proximate the second edge portion 42. Each of first lenses 46 is configured to have for example the triangular profile shape such that light received from each of the LEDs 38 is spread from a narrow top portion 68 and distributed through a widened bottom portion 70. Each of the first lenses 46 may be arranged such that an overlapping portion 72 is formed between each of the neighboring first lenses 46. The overlapping portion 72 is configured to ensure that light from each LED 38 is distributed evenly to the second lens 48. The second lens 48 is configured to receive light emitted through each of the first lenses 46 and diffuse the light such that the overlapping portion 72 of each of the first lenses 46 is emitted evenly from the lighting device 32. In this configuration, the lighting device 32 is operable to emit light evenly along the length L to generate a consistent ambient glow from the second lens 48.

A cutout portion 74 or partially assembled portion is also shown in FIG. 3B to demonstrate the conductive portion 76 extending proximate the second edge portion 42 of the circuit 36. The length L of the circuit 36 corresponds to the length of the panel 34 and the corresponding opening 24 as shown in FIGS. 1 and 2. The conductive portion 76 corresponds to an isolation terminal that may be implemented by an exposed ground terminal disposed on the circuit 36. The conductive portion 76 is positioned proximate the touchable region 44 and is configured to conduct an electrical discharge, for example an ESD, away from the at least one LED 38 and light controller circuit 66.

Figure 4:
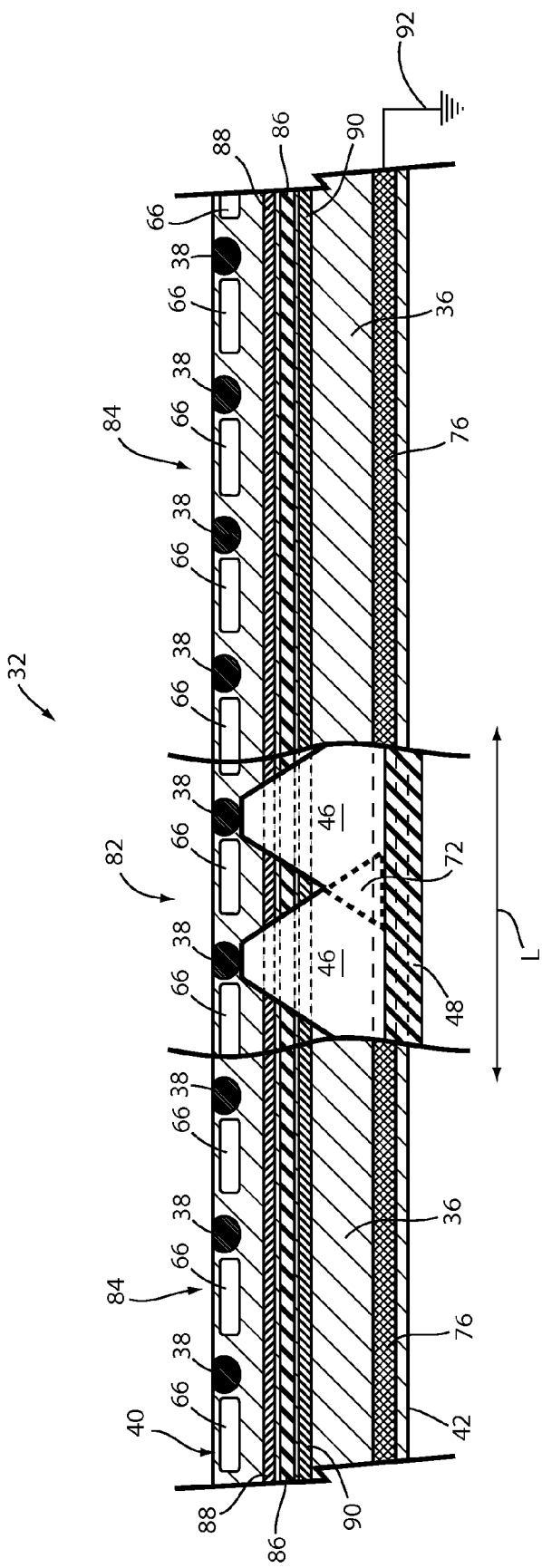
FIG. 4 is a detailed view of a lighting device demonstrating an exposed conductive portion for electrostatic discharge protection.

Referring now to FIG. 4 a detailed view of the lighting device 32 and the circuit 36 is shown. An assembled portion 82 of the lighting device 32 is shown as a reference to demonstrate each of the first lenses 46 and the second lens 48. The circuit 36 is further shown in greater detail than previously described by hiding or removing each of the first lenses 46 and the second lens 48 for clarity as shown in the partially assembled portions 84. The circuit 36 includes each of the light controllers 66 and the LEDs 38 located proximate the first edge 40. Each of the light controllers 66 and LEDs 38 is spaced uniformly along the length L of the circuit 36 to emit the light evenly from the second edge portion 42 along the length L of the circuit 36.

In FIG. 4, further details of the circuit 36 are shown illustrating the control line 86, a system ground line 88 and a power supply line 90. Each of the light controllers 66 is in communication with a central controller via the control line 86. The light controllers 66 are further supplied power through the power supply line 90 and the system ground line 88. The central controller is configured to control each of the light controllers 66 to selectively control the light emitted from each of the LEDs 38. A circuit diagram describing the operation of each of the light controllers 66 by the control line 86 is discussed in reference to FIG. 5.

The conductive portion 76 is disposed proximate the second edge portion 42 of the circuit 36. When disposed in a cavity in the vehicle 12, the conductive portion 76 is positioned proximate the touchable region 44 and the opening 24. The conductive portion 76 is configured to conduct an electrical discharge, for example an ESD, away from the at least one LED 38. The conductive portion 76 is configured to conduct electrical energy proximate the second edge portion 42 to an isolated ground 92. As such, the conductive portion 76 may comprise any conductive material that is exposed to the environment proximate the touchable region 44 to conduct an electrical discharge. Such materials may include copper, aluminum, gold, silver, platinum, iridium, carbon or any other electrically conductive materials that may be incorporated as an exposed layer, wire, coating or terminal of the circuit 36.

Figure 5:
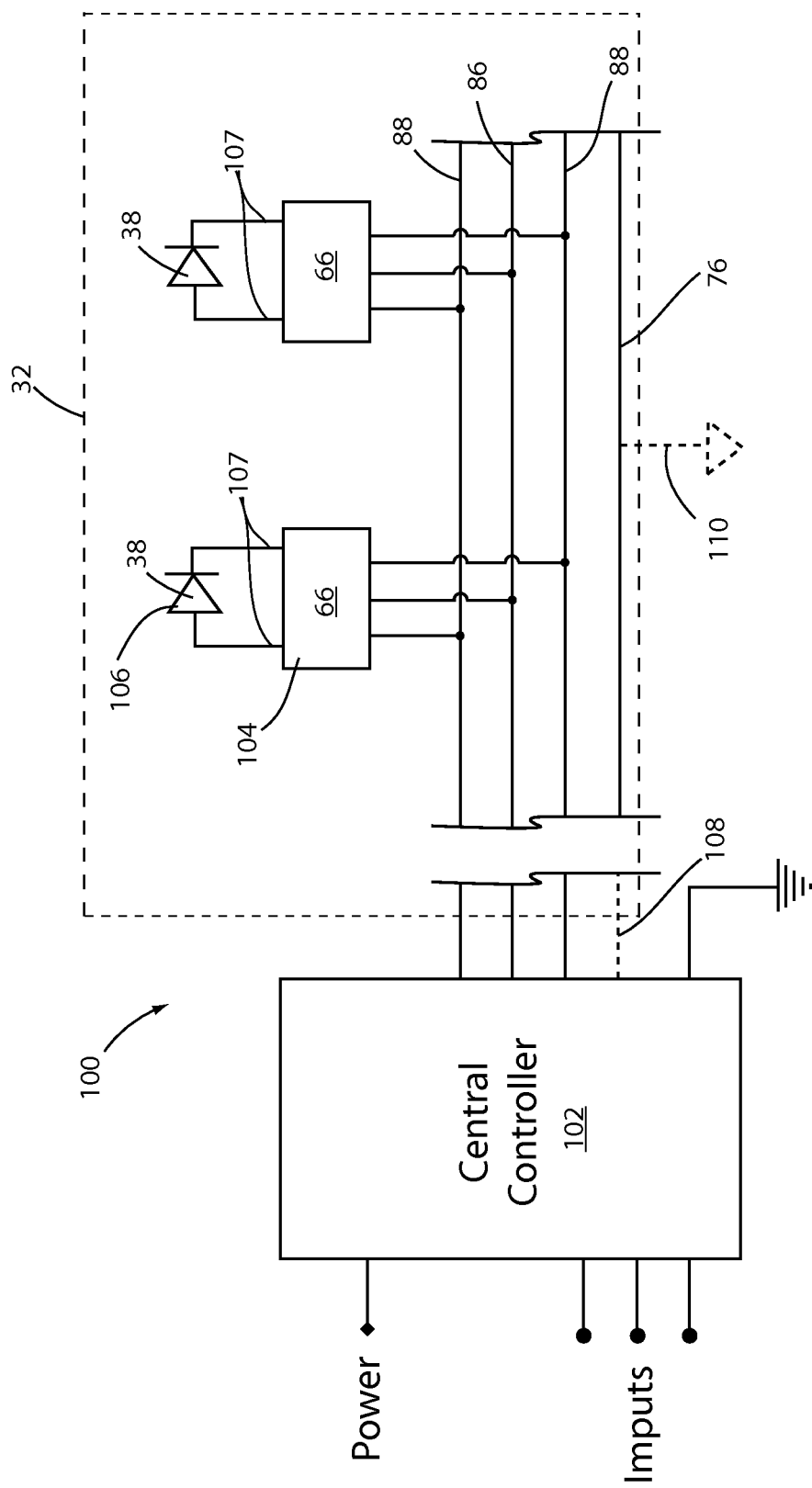
FIG. 5 is block diagram of a lighting system for a lighting device in accordance with the disclosure.

FIG. 5 is block diagram of a lighting system 100 including the lighting device 32 in accordance with the disclosure. Each of the light controllers 66 is in communication with the central controller 102 via at least the control line 86. The light controllers 66 are configured to receive power from the central controller 102 via the power supply line 90 and the system ground line 88. Each of the controllers 66 is further in communication with and configured to control the at least one LED 38 in response to at least one signal received from the central controller 102 via the control line 86. In this configuration, the central controller 102 is operable to control each of the LEDs 38 by emitting a control signal that may be identified by a specific light controller 104 of the light controllers 66.

For example, the central controller 102 is in communication with the specific light controller 104 via the control line 86. In order to control the lighting intensity, color, and/or frequency or other aspect of the lighting devices associated with a specific light controller 104, the central controller 102 may communicate a signal via the control line 86 including an address or identifier and an instruction corresponding to the specific light controller 104. In response to the receipt of the identifier from the central controller 102, the light controller 104 may respond by activating a specific LED 106 according to the instruction from the central controller 102. In this way, the central controller 102 is configured to selectively activate and control each of the LEDs 38 of the lighting system by communicating signals via the control line 86 to selectively activate specific LEDs of the lighting device 32. Further, the central controller may be configured to control a plurality of lighting devices installed throughout the passenger compartment 10 of the vehicle 12 to provide various dynamic lighting sequences in various locations of the vehicle 12 in a contrasting or coordinated manner.

Each light controller 66 may comprise at least one circuit configured to control the brightness of a connected LED (e.g. the specific LED 106). The light controller 66 comprises a brightness control circuit configured to adjust the brightness or intensity of a light source in response to the signal received from the central controller 102. In response an instruction from the central controller 102, the light controller 104 may supply voltage/current to the LED 106 and vary the intensity of the light emitted based on a voltage/current level or a voltage/current signal. The voltage/current signal is communicated to the LED 106 via terminals 107 connecting each of the light controllers 66 to a corresponding at least one LED 38. In some implementations, the intensity of a light source may be controlled by a light controller by varying the voltage/current signal in a periodic signal, such as with pulse width modulation. In response to a frequency of the periodic signal, the light source may output a level of light that may be perceived to be brighter or dimmer corresponding to faster and slower frequencies or longer and shorter pulse widths. For example, the LED brightness may by varying a duty cycle of the voltage/current to control the brightness or intensity level of light emitted from the LED.

Each of the at least one LEDs 38 may correspond to a grouping of LEDs, for example a red green blue (RGB) pixel array, bi-color LED, tri-color LED, multicolor LED, etc. By implementing each of the at least one LEDs 38 as in RGB pixel array, the central controller 102 may be operable to send instructions to each light controller 66 to further control a color of the light emitted from each of the at least one LEDs 38. Though LEDs are discussed in detail in this disclosure, other similar light sources may be implemented in the lighting device 32 disclosed herein. For example, each of the at least one LEDs 38 discussed herein may be implemented by phosphor based LEDs, organic LEDs (OLED), quantum dot LEDs, or any other similar lighting technology that may benefit from protection from a proximate electrical discharge.

The conductive portion 76 as discussed previously is disposed proximate the second edge portion 42 of the lighting device 32. In a first configuration 108, the conductive terminal is in communication with the central controller 102 via an isolated ground. The isolated ground may comprise an earth ground or similar ground configured to isolate the central controller, the light controllers 66 and the LEDs 38 from an electrical discharge. In a second configuration 110, the conductive terminal may be connected directly to an earth ground isolated from the central controller 102. Though two configurations of the conductive portion 76 are demonstrated herein, additional configurations for the conductive portion may vary in conformance with the spirit of the disclosure.

In the various implementations of the disclosure, the conductive portion 76 may provide an exposed conductive terminal proximate a touchable region 44 of the lighting device 32 to protect the at least one LED 38 from an electrical discharge, for example an ESD. The exposed conductive terminal may be exposed to the environment, proximate the touchable region 44 while each of the control line 86, the system ground line 88, and the power supply line 90 may be coated in a laminate configured to adhere, insulate, and seal the conductive material. As such, the exposed conductive portion 76 may provide an isolated path for an electrical discharge to be conducted away from the at least one LED 38 to prevent damage to the lighting device 32.

The various devices and systems described herein may be implemented to provide dynamic lighting controlled by a central controller to emit light. The central controller may control a plurality of lighting controllers coupled to LEDs to emit light that appears to move throughout the passenger compartment of a vehicle by sequencing consecutive lighting devices. The lighting systems and lighting devices provide various benefits including cost-effective implementations of dynamic lighting while maintaining robust operation including protection from ESD. The lighting system disclosed herein provides for a novel approach to implement dynamic lighting in a vehicle by including an exposed conductive portion on a circuit proximate an opening of a cavity in which a lighting device is disposed. The lighting devices discussed herein provide a significantly reduced package size and may be safely installed in a passenger compartment near a potential area of ESD without risking damage to the lighting system.

The methods and devices described above may be implemented in many different ways in many different combinations of hardware, software or both hardware and software. For example, all or parts of the central controller 102 may include circuitry in a controller, microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or any other machine-readable medium.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting assembly comprising a circuit configured to be disposed in a panel defining an elongated trough forming an opening, the circuit comprising:
   a plurality of light sources in communication with a controller;
   a plurality of discrete spreading lenses disposed proximate each of the light sources, wherein each of the discrete spreading lenses form overlapping sections between neighboring discrete spreading lenses; and
   an exposed conductive portion conductively connected to an isolation terminal, wherein the exposed conductive portion corresponds to an exposed ground layer of the circuit and is oriented proximate the opening providing a path for an electrical discharge, wherein the overlapping sections gradually increase in overlap to an edge portion proximate the exposed conductive portion.

2. The assembly according to claim 1, wherein the circuit is configured to emit light from the light source through the opening.

3. The assembly according to claim 1, wherein the circuit is configured to conform to the elongated trough, the elongated tough forming an enclosed portion.

4. The assembly according to claim 3, wherein the circuit further comprises a first edge portion and a second edge portion, the light source being located proximate the first edge portion and the conductive portion being located proximate the second edge portion.

5. The assembly according to claim 4, wherein the first edge portion is configured to align proximate the enclosed portion.

6. The assembly according to claim 1, wherein the conductive portion extends in uniform proximity to the second edge portion.

7. The assembly according to claim 1, wherein the conductive portion comprises an exposed conductive terminal.

8. A lighting apparatus comprising:
   a circuit comprising:
      a plurality of light sources proximate a first edge portion;
      an exposed grounded conductor proximate a second edge portion;
      a plurality of distinct first lenses disposed proximate each of the light sources, the first lenses comprising a uniform thickness from a light receiving portion to a light emitting portion, the light emitting portion forming an overlapping section with an adjacent first lens of the plurality of first lenses; and
      a controller in communication with each of the plurality of light sources,
   wherein the circuit is configured to be disposed in a panel defining an elongated trough, the exposed grounded conductor oriented proximate an opening formed by the trough.

9. The apparatus according to claim 8, wherein the circuit is configured to conform to the elongated trough such that a distance from the opening to the plurality of light sources is less than 25 mm.

10. The apparatus according to claim 8, wherein the plurality of first lenses are configured to spread light from each light source along the second edge portion of the circuit.

11. The apparatus according to claim 10, wherein each of the first lenses comprises a substantially triangular profile.

12. The apparatus according to claim 11, wherein the triangular profile comprises a narrow portion configured to receive light from each light and a wide portion configured to transmit light to the second edge portion and outward through the opening.

13. The apparatus of claim 10, further comprising a second lens abutting the plurality of first lenses and configured to diffuse light along the second edge portion of the circuit.

14. A circuit assembly comprising:
   a plurality of light sources proximate a first edge portion, each light source in communication with a controller;
   a plurality of spreading lenses disposed proximate each of the light sources wherein the spreading lenses form overlapping sections between neighboring spreading lenses;
   an exposed conductive portion connected to an isolation terminal extending proximate a second edge portion, wherein the exposed conductive portion corresponds to an exposed ground layer of the circuit, and
   wherein the circuit assembly is configured to be disposed in a trough comprising an opening proximate the second edge portion, wherein the overlapping sections gradually increase in overlap to the second edge portion.

15. The assembly according to claim 14, wherein the exposed portion comprises an exposed conductive surface in communication with a ground terminal to provide a conductive path for ESD proximate the opening.

16. The assembly according to claim 14, wherein each of the spreading lenses form a narrow receiving portion configured to receive light from the plurality of light sources, wherein the light is spread from the narrow receiving portion to a widened emitting portion.

17. The assembly according to claim 14, wherein each of the spreading lenses is distinct from the neighboring spreading lenses and comprises a uniform thickness extending from the narrow receiving portion to the widened emitting portion.

18. The assembly according to claim 14, wherein each of the plurality of spreading lenses forms a distinct body configured to transmit light from the plurality of light sources to the second edge portion.

* * * * *